United States Patent
Lucas Zaragoza et al.

(10) Patent No.: US 12,272,241 B2
(45) Date of Patent: Apr. 8, 2025

(54) ARTIFICIAL INTELLIGENCE FOR RESPONSIVE OPERATION FOR VEHICLE FLEET MANAGEMENT AND METHOD THEREOF

(71) Applicant: Siemens Rail Automation S.A.U., Tres Cantos (ES)

(72) Inventors: Ruben Lucas Zaragoza, Alcazar de San Juan (ES); Ignacio Fernandez Munoz, Madrid (ES); Antonio Diaz Ortiz, Madrid (ES)

(73) Assignee: Siemens Rail Automation S.A.U., Tres Cantos (ES)

( * ) Notice: Subject to any disclaimer, the term of this patent is extended or adjusted under 35 U.S.C. 154(b) by 272 days.

(21) Appl. No.: 17/949,391

(22) Filed: Sep. 21, 2022

(65) Prior Publication Data

US 2023/0091588 A1 Mar. 23, 2023

(30) Foreign Application Priority Data

Sep. 21, 2021 (EP) ..................................... 21382851

(51) Int. Cl.
*G08G 1/127* (2006.01)
*G06Q 50/40* (2024.01)
*G08G 1/00* (2006.01)

(52) U.S. Cl.
CPC .............. *G08G 1/127* (2013.01); *G08G 1/20* (2013.01); *G06Q 50/40* (2024.01)

(58) Field of Classification Search
CPC .......... G08G 1/127; G08G 1/20; G06Q 50/40; G06Q 10/0834; G06Q 30/0205; G06Q 10/06393
See application file for complete search history.

(56) References Cited

U.S. PATENT DOCUMENTS

| | | | |
|---|---|---|---|
| 8,259,659 B2 * | 9/2012 | Luft | H04W 74/0833 370/337 |
| 2010/0002582 A1 * | 1/2010 | Luft | H04W 74/0866 455/574 |

(Continued)

OTHER PUBLICATIONS

Zhou, Yuhe et al. "Metro Scheduling to Minimize Travel Time and Operating Cost Considering Spatial and Temporal Constraints on Passenger Boarding", IEEE Access: IEEE; USA; vol. 8, Jun. 22, 2020; pp. 114190-114210; XP011796427; DOI: 10.1109/ACCESS 2020:3004274.

(Continued)

*Primary Examiner* — Yonel Beaulieu
(74) *Attorney, Agent, or Firm* — Laurence A. Greenberg; Werner H. Stemer; Ralph E. Locher

(57) ABSTRACT

A method and a system dynamically adapt a passenger transport capacity of a transport line to the number of passengers determined for the transport line. The system contains a main evaluator configured for automatically determining, as a function of the time, the number of passengers for the transport line, and a processor configured for acquiring the number of passengers as a function of the time, a nominal timetable, and a nominal passenger transport capacity of each vehicle of the line. The processor applies a trained function to the number of passengers, and the trained function has been trained by a machine learning algorithm for predicting a future temporal evolution of the number of passengers. The processor is configured for determining a measure for adapting the transport capacity of the line to the future temporal evolution. The system is further configured for applying the measure to the transport line.

13 Claims, 2 Drawing Sheets

(56) References Cited

U.S. PATENT DOCUMENTS

2019/0228358 A1* 7/2019 Ootsuka ........... G06Q 10/06315
2020/0357091 A1* 11/2020 Minakawa .............. B61L 27/14

OTHER PUBLICATIONS

Patroklos, Samaras et al.: "A prediction model of passenger demand using AVL and APC data from a bus fleet", Informatics, ACM, 2 Penn Plaza, Suite 701, New York NY 10121-0701 USA; Oct. 1, 2015; pp. 129-134; XP058073869; DOI: 10.1145/2801948; ISBN: 978-1-4503-3551-5.

* cited by examiner

ARTIFICIAL INTELLIGENCE FOR RESPONSIVE OPERATION FOR VEHICLE FLEET MANAGEMENT AND METHOD THEREOF

CROSS-REFERENCE TO RELATED APPLICATION

This application claims the priority, under 35 U.S.C. § 119, of European Patent Application EP 21382851.0, filed Sep. 21, 2021; the prior application is herewith incorporated by reference in its entirety.

FIELD AND BACKGROUND OF THE INVENTION

The present invention concerns a system and a method for automatically managing a vehicle fleet over a road or railway network.

The present invention is essentially related to the field of transport vehicles, wherein the expression "transport vehicle" refers to public transport means such as subways, trains or train subunits, which might be guided by one or several rails along a track, but also buses, etc., which might be guided by a line or a marking on a road or route, or which follow a predefined path containing different stops or stations for passengers boarding or leaving the transport vehicle. More generally speaking, the present invention concerns vehicles which are configured for carrying passengers, whose moving is for instance determined by a headway operation mode, or schedule or timetable defining a time at which the vehicle has to stop at different locations or stations along its path, and for which the distribution of passengers within the different stations or locations wherein the vehicle has to stop might impact the schedule. Such vehicles may comprise several coaches, and/or several entrance/exit doors providing each a different way to access/exit the vehicle, e.g. its compartments or coaches (cars).

One problem related to such vehicles is that it is very difficult for operators to properly react to an unexpected passenger demand. In particular, the fact that an offer, i.e. a number of vehicles available for transporting passengers, differs from a demand, i.e. a number of passengers waiting for boarding a vehicle, often results in passenger congestions at stations, and/or in inefficient use of energy and/or resources.

For solving this problem, railway operators are for instance able to add or remove transport vehicles from a line based on known future events, like an increase of passengers due to a planned concert or football match. The transport vehicle timetable can then be manually adapted accordingly, in anticipation of the event, to provide a better service to the passengers.

Unfortunately, such solution to the problematic only works for well-defined and well-planed events and is not suitable for "unexpected" increase or decrease of passengers. It further requires the intervention of an operator. In particular, the known solutions cannot react to a cancellation of a planned concert, or to dynamic variations of the number of passengers during everyday life, which would require for instance a continuous adaptation of the timetable of transport vehicles.

SUMMARY OF THE INVENTION

An objective of the present invention is to propose a method and a system capable of managing a vehicle fleet by automatically, and preferentially continuously, adapting the offer of the vehicles to a passenger demand of a transport line. Another objective is to save energy by providing an efficient management of the vehicle fleet as a function of the passenger demand.

For achieving the objective, the present invention proposes a system and method for adapting or adjusting a number of vehicles running on a transport line of a road or railway network to a number of passengers of the transport line according to the objects of the independent claims. Other advantages of the invention are presented in the dependent claims.

The present invention concerns notably a system for dynamically adapting a passenger transport capacity of a transport line to a number of passengers of the transport line, i.e. to a number of passengers currently travelling or that are going to travel from one station to another station of the transport line. Preferentially, the adaptation according to the invention is automatically performed by the system according the invention, in that it is configured for automatically determining a current transport capacity of the line, automatically determining whether the current transport capacity needs to be adapted with respect to a predicted transport capacity demand, and automatically implementing a measure for adapting the current transport capacity of the line to the predicted transport capacity demand if needed.

The transport line typically serves at least two stations by means of transport vehicles (e.g. trains, metros, or buses), each station containing at least one platform configured for receiving passengers. The number of passengers of the transport line is for instance the number of passengers of one of its components or elements that are configured for receiving passengers. In particular, the components or elements comprise at least the transport vehicles, the stations, and the platforms of the stations of the transport line. The number of passengers of the transport line can be for instance a number of passengers waiting for one of the transport vehicles at a platform of a station and/or a number of passengers currently travelling in a transport vehicle of the transport line.

The system according to the invention contains a main evaluation unit and a processing unit.

The main evaluation unit is configured for automatically determining or measuring or counting, at different times (i.e. as a function of the time), a passenger number for the transport line. The main evaluation unit is thus configured for determining or measuring an evolution of the number of passengers for or of the transport line as a function of the time. The passenger number can be measured or determined for instance at different successive times, e.g. periodically, or at predefined times. In particular, the number of passengers of the transport line is the number of passengers of one of its components or elements. In particular, it can measure or determine the temporal evolution of the passenger number for different components or elements of the line at the same time, e.g. the temporal evolution of the number of passengers within a transport vehicle, and/or at a station, and/or of a platform of the line. Preferentially, the main evaluation unit determines the number of passengers that is going to (i.e. joining/reaching) a platform of the line as a function of the time, and it does it preferentially for each line platform that is served by a vehicle and configured for receiving passengers.

Preferentially, the main evaluation unit contains a vehicle transport capacity evaluation (hereafter "VTCE") unit and/or a platform passenger number evaluation (hereafter PPNE) unit. The VTCE unit is notably configured for determining or measuring, as a function of the time, a number of passengers currently occupying the transport vehicle, i.e. the number of passengers on-board the transport vehicle. It can do such a determination/measurement for all vehicles of the line.

This measurement or determination of the number of passengers on-board the transport vehicle as a function of the time enables the VTCE to measure the passenger transport capacity offered or provided by each vehicle of the transport line as a function of the time. In other words, the VTCE unit determines, for each vehicle that is going to stop at a platform, its passenger transport capacity when it arrives at the platform (e.g. just before it reaches the platform, or when it reaches the platform, but its doors are still close). For instance, if the platform belongs to a station B, and a vehicle is moving from a previous station A directly (i.e. without stop) to the station B, then the system determines, after the vehicle left station A and before it opens its door at station B, the number of passengers on-board the vehicle, and thus the remaining (i.e. current) passenger transport capacity of the vehicle (which can be for instance partially or fully occupied by passengers). It can preferentially determine the number of passengers (or current passenger transport capacity) shortly before reaching station B, e.g. 2-10 minutes before reaching the platform of the station B, or at any time during the moving from station A to station B. A goal is to determine the passenger transport capacity of the vehicle that will be provided or made available by the latter when stopping at the platform of a directly next station (before opening its doors for receiving newly boarding passengers). It is therefore preferentially determined during the trip (non-stop trip, i.e. direct trip) from a previous station wherein some passengers might have boarded the vehicle to the directly next station wherein the passengers are still waiting for the vehicle. The VTCE unit is thus configured for measuring or evaluating, as a function of the time, the number of passengers travelling in the vehicle, notably from one station (e.g. station A) to another station (e.g. station B), and thus to provide information about the evolution of the number of passengers on-board the transport vehicle as a function of the time. Each vehicle being characterized by a nominal passenger transport capacity defining the vehicle capacity when the latter is empty (no passengers), then the system according to the invention is configured for computing the current transport capacity of the considered vehicle by making the difference between the nominal capacity (e.g. 250 sitting places and 100 standing places) and the measured or determined number of passengers inside the vehicle (i.e. the current occupancy of the vehicle, e.g. 180 passengers).

The PPNE unit is notably configured for determining, as a function of the time, the number of passengers waiting at a platform (i.e. the occupancy of a platform in function of the time) for one of the vehicles serving the platform and/or the number of passengers going to or joining or reaching a platform as a function of the time (i.e. the flow of passengers going to the platform). In other words, the PPNE unit is notably configured for determining or estimating, for instance continuously or periodically, the number of passengers waiting for an incoming vehicle at a platform and/or the number of passengers going to the platform. It can preferentially do it for one, several, or all platforms of one, several, or all stations of the line. This number of passengers waiting for an incoming vehicle or going to a platform may change or evolve as a function of the time: for instance, a long time before the arrival of the vehicle at the platform, the number of passengers waiting for the vehicle or going to the platform is low, and shortly before the arrival, the number of the passengers is higher. Advantageously, the PPNE unit is thus capable of determining, for each vehicle that stops at the platform, the number of passengers which were waiting for the vehicle.

Preferentially, the main evaluation unit is configured for storing each determined number and the time at which it was determined or measured in a database, and/or automatically sends the number and the time to a processing unit according to the invention. Preferentially, the main evaluation unit or the processing unit is configured for generating or creating, for each component or element of the line for which the temporal evolution of the passenger number is determined or measured, a set of data containing each number of passengers determined for the component, for each number the time at which it was determined, and optionally an identifier of the component or element.

The processing unit is configured for receiving or acquiring the following input data:
  passenger number(s) as a function of the time determined or measured for the transport line, i.e. the temporal evolution of the number of passengers measured or determined for the transport line;
  a nominal timetable; and
  a nominal passenger transport capacity for the vehicles of the line.

In particular, the processing unit can acquire or receive the temporal evolution of the number of passengers of one or several of the elements or components of the transport line, for instance for one or several of its transport vehicles, and/or one or several of its platforms, and/or for one or several of its stations. Preferentially, the processing unit receives or acquires the temporal evolution of the determined or measured passenger numbers of each of the components or elements of the transport line. Preferentially, the main evaluation unit automatically sends to the processing unit the temporally successive determined passenger numbers, wherein each of the temporally successive measured or determined passenger numbers is associated to a time value, i.e. the time at which it was measured or determined (like $T\_0, T\_1, \ldots, T\_N$). For instance, the processing unit may receive the number of passengers on-board one or several transport vehicles that have been acquired at different times (i.e. the temporal evolution of the number of passengers on-board the one or several vehicles of the line) as determined by the VTCE unit and/or the passenger number at one or several platforms of the line or going to the one or several platforms as determined by the PPNE unit. Optionally, instead, or together with, the determined number of passenger on-board the vehicle, the processing unit may receive the passenger transport capacity of the vehicle, which is also associated to a time value that is the time at which it was determined or measured by the VTCE unit. Each passenger number inputted to the processing unit is thus associated to a time or time value which enables the processing unit to compute a temporal evolution of the inputted number, wherein the temporal evolution defines the variation of the number of passengers with respect to the time for the line, notably for the component or element of the line for which the number of passengers was measured or determined. This temporal evolution can thus be computed by the processing unit for one, several, or all vehicles of the line and/or one, several, or all platforms of the line, and/or for one, several, or all stations of the line.

Each passenger number determined for a component is preferentially associated to a component identifier, e.g. a vehicle or platform identifier, enabling the processing unit to determine for which component of the line this number was determined in addition to the time at which it was determined.

The nominal timetable defines the nominal departure and arrival times of the vehicles of the line, i.e. the serving of the platforms of the line by the transport vehicles. As known in the art, the timetable describes the schedule of each vehicle of the line, i.e. it identifies each station wherein it has to stop, and for each station, its nominal arrival time and nominal departure time.

The nominal passenger transport capacity of each transport vehicle of the line is also received or acquired by the processing unit. As already mentioned, the nominal passenger transport capacity of the vehicle is its capacity when it is free of passengers, i.e. empty. This nominal passenger transport capacity is acquired by the processing unit from any available database, for instance from a control center database, or might be provided to the system according to the invention by an operator. It is acquired for all vehicles running on the line and serving the platform, as well as any sleeping vehicle (e.g. stand-by or turned off vehicle in a depot) that can be used for serving the platform.

The processing unit is then configured for applying a trained function to the number of passengers as a function of the time, wherein the trained function has been trained by a machine learning algorithm for automatically predicting a future temporal evolution of the number of passengers. Preferentially, the processing unit is configured for receiving or acquiring or generating, for a component of the line for which the number of passengers has been determined as a function of the time, the set of data comprising the number of passengers as a function of the time, i.e. the temporal evolution of the number of passengers for the concerned component, the temporal evolution taking place within a first period of time. The processing unit is then configured for using the set as input to the trained function, the latter being configured for outputting a set of data, wherein the outputted set of data defines, for the component, the future temporal evolution of its number of passengers within a second period of time located in the future with respect to the first period of time. If the passenger number is determined or measured for several of the elements or components of the line, then all of the passenger numbers are used together as input to the trained function, the latter outputting the temporal evolution of each of the passenger numbers (for instance, the temporal evolution of the passenger number of several vehicles and several platforms). For instance, if the processing unit receives or acquire a first set of data describing the temporal evolution of the number of passengers for a first component during a first period of time, and a second set of data which has been determined for a second component, the second set of data containing thus number of passengers as a function of the time, i.e. a temporal evolution of the number of passengers for the second component. The temporal evolution takes place also within the first period of time, then the processing unit uses the second set of data together with the first set of data as input to the trained function, the latter being configured for outputting. In addition to a first outputted set of data describing the future temporal evolution of the number of passengers of the first component, a second outputted set of data, wherein the second outputted set of data defines, for the second component, the future temporal evolution of its number of passengers. Otherwise, the trained function may receive as input several sets of data, wherein each set defines the temporal evolution of the number of passengers of one of the elements or components of the line, all sets defining the temporal evolution during a same (first) period of time. The trained function being then configured for outputting several sets of data. Wherein each of the outputted sets of data is associated to one of the inputted set of data and thus to one of the elements or components, and defines, for the component or element, the future temporal evolution of its number of passengers, i.e. the number of passengers of the element or component as a function of a future time, the future time belonging to another period of time (also called second period of time) located in the future with respect to the first period of time (the latter comprising the different times at which the number of passengers of the inputted set was determined or measured).

The processing unit is further configured for automatically determining, from:
a) predicted future temporal evolution of the passenger number, for instance from the future temporal evolution of the number of passengers of the first component and from the future temporal evolution of the number of passengers of the second component,
b) nominal timetable, and
c) nominal passenger transport capacity, a measure for adapting the transport capacity of the line to the future temporal evolution. For this purpose, the processing unit contains notably a transport capacity adaptation (hereafter "TCA") algorithm configured for automatically determining the measure. In particular, the TCA algorithm uses as input the predicted future temporal evolution of the numbers, the timetable, the nominal passenger transport capacity, and outputs the measure, and optionally an updated timetable comprising the measure. Preferentially, the processing unit might be configured for controlling the line, e.g. its vehicles, and/or stations, and/or platforms, and/or signals, according to the updated timetable. Alternatively, the updated timetable might be automatically sent by the processing unit to a control center in charge of the control of the traffic of the line, the control center automatically applying the updated timetable to the line. This enables a dynamic adaption of the number of running vehicles on the line and of their departure and arrival time at the stations as a function of a predicted transport capacity demand, i.e. the predicted temporal evolution of the number of passengers of the line, for instance of one or several of its components or elements.

The measure is for instance a modification of the timetable that can consist in:
a) adding a vehicle to the line if, in the future temporal evolution, the number of passengers of the line, e.g. of one or several of its components, exceeds a predefined threshold for a given period of time. The added vehicle is typically a vehicle turned off or in stand-by in a vehicle depot of the line, that is selected for instance as a function of the position of the vehicle depot where it is located and/or as a function of its nominal transport capacity, and which is then added to the line; or
b) withdrawing a vehicle from the line if, in the future temporal evolution, the number of passengers of the line, e.g. of one or several of its components, is smaller than a given threshold for a given period of time. The processing unit is for instance capable of determining, as a function of the nominal capacity of each running vehicle of the line, and/or position with respect to a vehicle depot, which vehicle has to be withdrawn from the line for satisfying the measure; or c) otherwise maintaining the transport capacity defined by the nominal timetable.

As previously explained, the processing unit is preferentially configured for applying, e.g. automatically, the measure to the transport line, by sending for instance a message to a control center, the message requiring an implementation the measure. The updated timetable is a timetable that implements the measure, and which can be sent to a control center in charge of managing the vehicle traffic on the line. Preferentially, the processing unit generates periodically such updated timetables, which are then automatically implemented, e.g. by means of a centralized system of the control center, if the updated timetable differs from the current timetable of the line. The current timetable can be the nominal timetable or a previously updated timetable.

Preferentially, the system according to the invention, notably its processing unit, is configured for storing in a memory or in a database, e.g. in a cloud, the passenger numbers. Each stored passenger number is preferentially associated to a date and a component identifier (e.g. a platform identifier or a vehicle identifier or a station identifier or a line identifier), and optionally a position, wherein the date (e.g. day, month, year, and hour) is configured for indicating the time at which the number has been determined or measured, and the position may indicate the position of the component with respect to the line, e.g. the position of the vehicle when the number has been determined. By this way, the processing unit can construct or generate a database describing the temporal evolution of the number of passengers of each component of the line for which a number of passengers is determined or measured. For each component, the passenger number might be measured or determined over a long period of time, e.g. during a complete year. Preferentially, the database is continuously populated with newly determined numbers. The database can then be used for the training or an additional training of the function configured for automatically predicting a future temporal evolution of the number of passengers of the line.

The system according to the invention can thus automatically adapt the passenger transport capacity of a line serving a platform to predicted variations of the number of passengers desiring to travel on the line from the platform. The invention enables notably a dynamic adaptation of the number of vehicles serving a line, i.e. running on the line, as a function of the flow of passengers who will use the line for moving from one station to another station. Advantageously, since the evolution of the number of passengers is predicted by the trained function, measures, like adding a vehicle to the line, can be taken early enough in order to prevent any congestion of a platform of the line.

The present invention concerns also a method for dynamically adapting a passenger transport capacity of a transport line to a number of passengers of the transport line. The transport line comprises typically several stations comprising one or several platforms served by transport vehicles of the transport line. The method according to the invention includes:

a) determining or measuring or counting, at different times, a passenger number of or for the transport line. Preferentially, the passenger number of one or several elements or components of the line is determined (or measured or counted) as a function of the time in order to acquire the temporal evolution of the passenger number for each of the one or several components. For instance, a number of passengers on-board a transport vehicle and/or a number of passengers waiting at a platform for one of the transport vehicles of the transport line, and/or a number of passengers going to or joining the platform, and/or a passenger number entering and/or leaving a station of the line can be determined, wherein each of the numbers of passengers is determined at different times in order to get a temporal evolution of the passenger number of each component of the line for which it is determined;

b) receiving, by a processing unit, the following input data:
  the passenger number counted, measured or determined at different times, i.e. a temporal evolution of the number of passengers. Preferentially, it receives the temporal evolution of the passenger number, for one, several, or all, components of the line for which the passenger number is determined at different times;

c) a nominal timetable defining the serving of the platforms of the line by the transport vehicles;

d) a nominal passenger transport capacity of each transport vehicle of the line;

e) applying, by the processing unit, a trained function to the temporal evolution of the passenger number, wherein the trained function has been trained by a machine learning algorithm for automatically predicting a future temporal evolution of the number of passengers. The trained function uses as input the passenger number determined as a function of the time (i.e. the temporal evolution of the passenger number) for the different elements or components of the line for which such passenger numbers were determined and outputs, for each of the different elements or components, the temporal evolution of their passenger number. The temporal evolutions of several components of the line are preferentially used together as input of the trained function. For this purpose, the temporal evolutions have to cover a same period of time;

f) automatically determining, from the predicted temporal evolution, nominal timetable, and nominal transport capacity, a measure for adapting the transport capacity of the line to the future temporal evolution or to the future temporal evolutions if the temporal evolution of several components of the line have been determined and used as input for determining the measure. Indeed, the processing unit according to the invention preferentially uses as input the predicted temporal evolution of the passenger number obtained for each of the elements or components for which passenger numbers were counted or measured or determined together with the nominal timetable and nominal transport capacity for determining the measure;

g) preferentially, applying the measure to the transport line.

Other features which are considered as characteristic for the invention are set forth in the appended claims.

Although the invention is illustrated and described herein as embodied in an artificial intelligence for responsive operation for vehicle fleet management, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
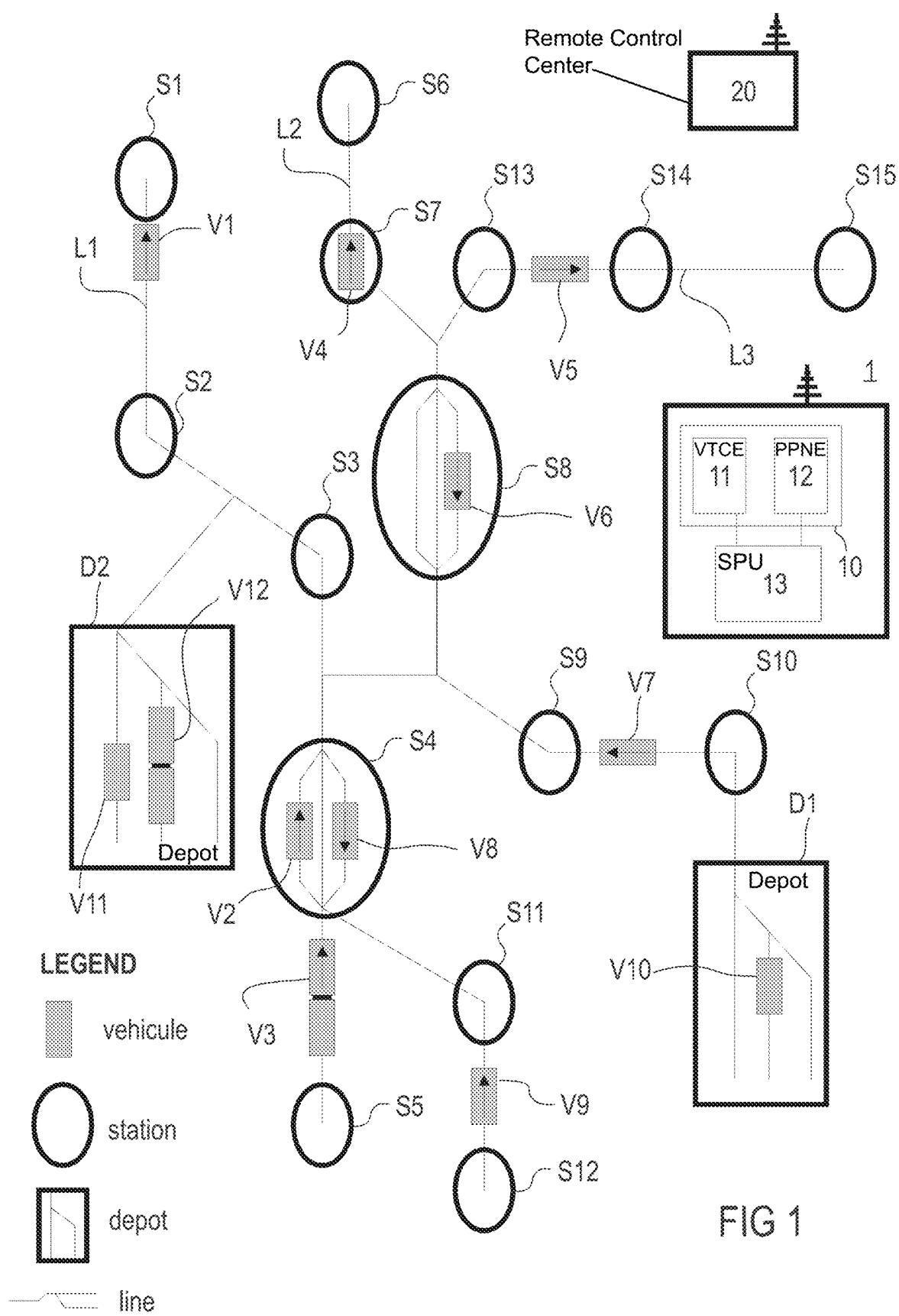
FIG. 1 is a schematic representation of a system for dynamically adapting a passenger transport capacity of a transport line according to the invention.

Referring now to the figures of the drawings in detail and first, particularly to FIG. 1 thereof, there is shown a preferred embodiment of a system 1 according to the invention. The system 1 enables an optimized management of a fleet of vehicles configured for running on a passenger transport network, e.g. a railway network and/or a bus network, by continuously or intermittently determining a demand (that is a number of passengers requiring a vehicle for moving from a first station to a second station) and dynamically adapting an offer (that is a number of vehicles running on the line(s) which serves the first and second station) as a function of the demand. In order to better understand the concept of the present invention, FIG. 1 is presented. The latter shows schematically a transport network containing in particular:
a) lines L1, L2, L3;
b) stations S1-S15;
c) vehicles V1-V12; and
d) vehicle depot(s) D1, D2 which may comprise one or several vehicles turned off or on stand-by.

Figure 3:
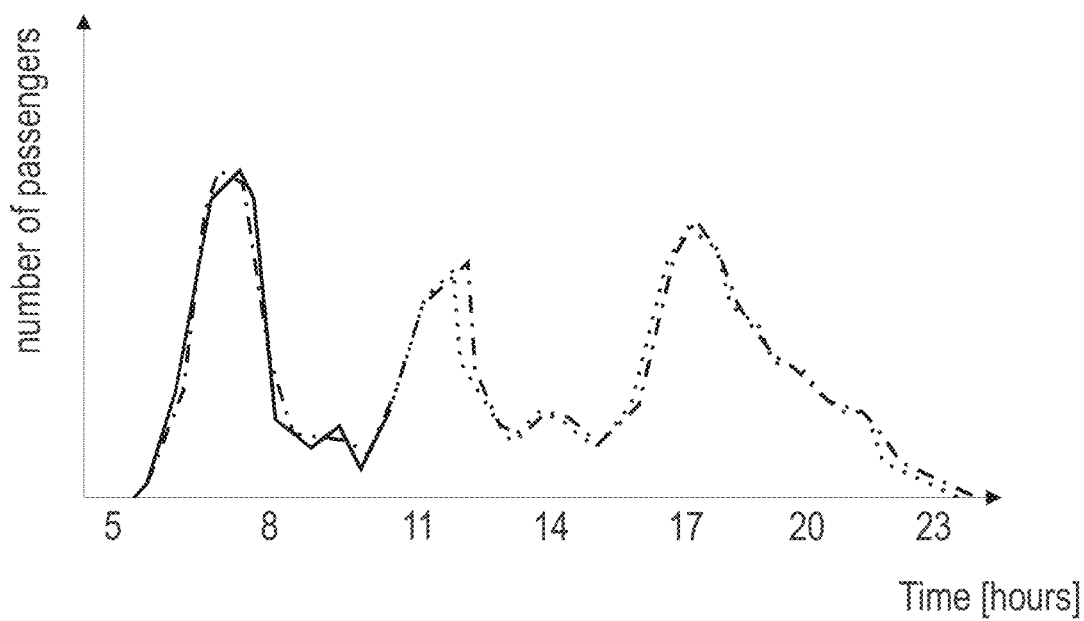
FIG. 3 is schematic representation of a temporal evolution of the number of passengers as a function of the time.

According to this non-limiting exemplary transport network, a first line L1 is configured for enabling vehicles to move from station S1 to station S5 via successively stations S2-S3-S4, and vice versa. A second line L2 of the network is configured for enabling vehicles to move from station S6 to station S12 via successively stations S7-S8-S4-S11-S12, and vice versa. And a third line L3 of the network is configured for enabling vehicles to move from station S15 to station S10 via successively stations S14-S13-S8-S9-S10, and vice versa. Different vehicles V1-V12 are running on the network, wherein the location or position of the vehicles as a function of the time and with respect to the transport network is defined by a known in the art timetable, which defines for instance for each vehicle an itinerary or trip on the network, and its arrival and departure times for each station of the itinerary. As explained in the introduction, such a timetable is, according to prior art techniques, predefined and cannot evolve as a function of an unplanned increase or decrease of the number of passengers waiting for a vehicle on the platform of one of the stations S1-S15. The present invention makes it possible to dynamically adapt such a timetable to the temporal evolution of the demand, i.e. the temporal evolution of the number of passengers waiting for a vehicle and/or going to a platform, by acquiring or determining in live, for instance in real time, the number of passengers of the line, e.g. the number of passengers onboard one or several vehicles of the line and/or the number of passengers waiting for a vehicle at one or several station platforms and/or going to the one or several platforms, and then by predicting a future temporal evolution of each of the numbers of passengers from their known past temporal evolution (i.e. from the previously determined or measured or counted numbers, e.g. from the numbers of passengers acquired or determined at different times for the concerned vehicles and platforms), and to automatically adapt the timetable to the future evolution. FIG. 3 proposes a schematic illustration of this concept: it shows a temporal evolution of the number of passengers (ordinate) as a function of the time (abscissa). The time represents for instance a day, from 5 o'clock in the morning to midnight. The number of passengers represents for instance the number of passengers waiting at a platform for an incoming vehicle. One considers that the present time is approximately 11 o'clock in the morning. Three curves are represented on the graph:
a) a full line going approximately from 5 o'clock to 11 o'clock in the morning. It represents the number of passengers that have been currently determined by the main evaluation unit until now (11 o'clock);
b) a dash-dot line going approximately from 5.30 in the morning until midnight. It represents the predicted temporal evolution of the number of passengers for this platform. The temporal evolution is continuously adapted to the currently determined number of passengers. This means that, if, at 11 o'clock, there is a sudden increase of the number of passengers, a trained function will automatically adapt its prediction of the temporal evolution of the number of passengers to this sudden increase. This enables to dynamically react to variations of the demand for transport capacity. The predicted temporal evolution can be calculated for the whole day or for the next hour or couples of hours. The real evolution of the passenger number, i.e. the determined passenger numbers as a function of the time, are preferentially used for continuously populating a database used for training the trained function so that its predictions become more and more precise.
c) a dotted line going approximately from 11 o'clock to midnight: it shows the future real passenger numbers that will be determined by a main evaluation unit, and thus the difference between the prediction and the reality.

In more details, the system 1 according to the invention contains a main evaluation unit 10 and a processing unit 13 configured for acquiring or receiving data or information (notably each determined or measured or counted passenger number) from the main evaluation unit 10. The main evaluation unit 10 is in charge of the determination or measurement or counting of the number of passengers for one or several of the lines. For each line, the number of passengers might be determined for one or several components or elements of the line. For each component or element, the number of passengers is determined at different times so that a temporal evolution of the number of passengers, as shown in FIG. 3, can be acquired by the system 1 according to the invention for each of the components or elements. It can for instance determine the number of passengers for at least one of the lines L1-L3 or for all lines. For each component or element of a line for which the number is determined, the system according to the invention is configured for predicting a temporal evolution of the number as illustrated by the dash-dotted line of FIG. 3, and determining a measure for adapting the transport capacity of the transport line to the predicted temporal evolution.

The elements or components are notably or comprise at least the vehicles V1-V12, the stations S1-S15, any platform of the stations S1-S15.

In particular, the main evaluation unit 10 comprises a VTCE unit 11 and a PPNE unit 12. The VTCE unit 11 and the PPNE unit 12 are for instance connected with the processing unit 13 for enabling the exchange of information or data. Additionally, the system 1 according to the invention comprises communication means for communicating with other devices, for instance with a remote-control center 20 in charge of managing vehicle traffic on lines L1, L2, L3 of the passenger transport network, e.g. a railway network, and/or with vehicles V1-V12, directly or indirectly, and/or with stations S1-S15, and/or with vehicle depot D1, D2, etc. The processing unit 13 comprises mainly one or several processors and a memory. It can comprise an interface for enabling its communication with other devices of the transport network.

Figure 2:
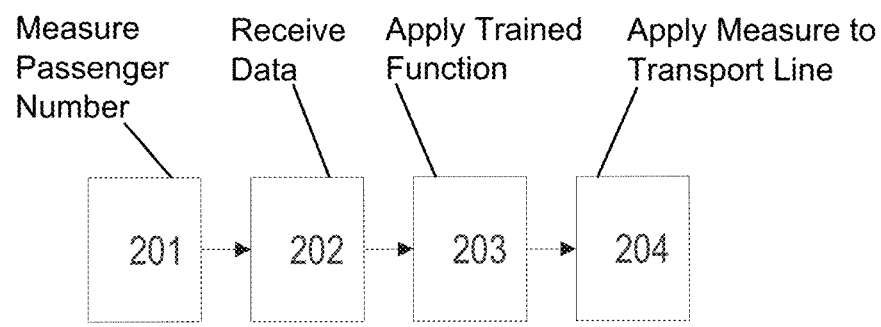
FIG. 2 is a flowchart of a preferred method according to the invention.

A preferred embodiment of the method for adapting a passenger transport capacity of a transport line to a number of passengers of the transport line will now be described based on FIG. 2. The method includes preferentially the following steps with respect to the system 1 illustrated in FIG. 1:

At step 201, the main evaluation unit 10 determines or measures or counts a passenger number for each transport line for which the transport capacity has to be adapted according to the invention. For instance, it determines the passenger number for the line L2. For each line for which a dynamic adaptation of the transport capacity according to the invention has to be performed, it preferentially determines the number of passengers of one or several of the line elements or components, the elements or components of the transport line. For instance, the passenger numbers determined for the line L2 might be: the passenger number of each platform of station S6, the passenger number of each platform of station S7, the passenger number on-board vehicle V4, the passenger number of each platform of station S8, the passenger number within vehicle V6, the passenger number of each platform of station S4, the passenger number of each platform of station S11, the passenger number on-board vehicle V8, the passenger number on-board vehicle V9, and the passenger number of each platform of station S12. Each of the passenger numbers is determined or counted or measured successively at different times in order to acquire their temporal evolution.

For instance, the PPNE unit 12 determines for station 8 and as a function of the time, the number of passengers waiting at a platform of the station 8 (let's call it platform A) for one of the vehicles running on the transport line L2, and/or going to the platform A. The PPNE unit 12 can perform such determination or measurement or counting of the number of passengers waiting for a vehicle of the transport line at a platform, and/or going to a platform, for all or a set of stations of the line and for all or a set of platforms of each of the stations. Preferentially, the PPNE unit 12 does the determination for all platforms of the transport network that are configured for receiving passengers in order to have a global view of the flows of passengers within the transport network. The PPNE unit 12 can thus be configured for acquiring and providing the current distribution of passengers on all platforms of the network that are configured for receiving passengers. This counting or measurement of the number of passengers waiting on a platform for an incoming vehicle, and/or going to the platform that is going to be served by the incoming vehicle, is preferably done in real time. Preferentially, the PPNE unit 12 can measure/count each passenger number continuously, or according to a given measurement/counting period, e.g. each 2 minutes, or each 5 or 10 minutes, and it preferentially sends the obtained value, i.e. the number of passengers determined for the platform, and the time at which it was determined, to the processing unit 13 or to a database in order to store, for instance for each platform of each station of the line that is configured for receiving passengers, the measured or determined value. For instance, the PPNE unit 12 can send to the processing unit 13, after each determination of a passenger number, the determined passenger number, the time at which it was determined, and an identifier of the platform for which it was determined, and the processing unit 13 stores in the database each received passenger number and its associated time and platform identifier, notably by populating a set of data created for the platform.

In order to determine the number of passengers, the PPNE unit 12 can use any known in the art techniques, like:

a) a camera system configured for acquiring images of a platform of a station of the transport line, and an image analysis system configured for counting the number of passengers waiting at and/or going to the platform from the acquired images, using for instance a human face counting algorithm. Such camera system might be installed at each platform of the transport line for which the number has to be determined, each camera system providing the image analysis system with images from the platform, wherein each camera system is configured for imaging the platform and the passengers of the platform to enable their counting by the image analysis system; and/or b) a turnstile system configured for counting the number of passengers accessing a platform and leaving the platform. In particular, the number of passengers waiting for the vehicle on the platform can be obtained from the difference between the number of passengers accessing and leaving the platform. Again, different platforms of the transport line might be equipped with such a turnstile system; and/or c) a ticketing system configured for evaluating a number of passengers waiting for a vehicle at a platform, and/or that will go to the platform, from an origin and destination station indicated on passenger tickets and a travelling time indicating a departure time from the origin station and an arrival time at the destination station; and/or d) any other system, preferentially equipping the platform, and configured for determining the number of passengers waiting for an incoming vehicle at the platform and/or a number of passengers that go to the platform; and/or e) person localization techniques using GPS and/or RFID and/or BLE and/or Wi-Fi connections to a Wi-Fi access point of the platform or of the station, and which enable to determine or count a number of persons within the area of the platform; and/or f) passenger detection system containing sensors for detecting motion (e.g. by counting the number of times an invisible light is crossed) or pressure variations or weight variations, or a combination of the latter; and/or g) a system containing heat sensors installed at the platform, configured for identifying body heat signatures and for counting from the identification the number of passengers at the platform;

h) etc.

The VTCE unit 11 according to the invention is configured for determining the number of passengers on-board a vehicle of the transport line. Preferentially, it determines the number of "on-board" passengers for several or all vehicles currently in service for a considered transport line, for instance for line L2, and can do it for one or several lines of the transport network. For a same vehicle, it determines or measures or counts the number of passengers at different times, for instance each time the vehicle leaves a station (e.g.

as soon as it closes its doors), or a predefined time before stopping at a station. It enables the system according to the invention to acquire a temporal evolution of the number of passengers occupying a vehicle of the transport line.

By determining the number of passengers as a function of the time for one or several components of the line, a trend in the temporal evolution of the number of passengers can be determined, like peak hours, weekends, working days, holidays, etc. The time means preferentially the date (day/month/year/hour/minutes/seconds) of the measurement/determination/counting of the number of passengers. This enables the processing unit 13 to know the demand as a function of the time and to predict a future temporal evolution of the latter. Indeed, this demand as a function of the time will be used to predict future demands as a function of the time, for instance future temporal evolutions of each of the numbers of passengers waiting at the platform and/or going to the platform for which a measurement/determination/counting was made.

As it will be explained below, from the temporal evolution, the processing unit 13 is then able to predict a future evolution of the number of passengers for the concerned vehicle, enabling thus the system according to the invention to predict also the future transport capacity of the vehicle when it will stop at a platform of a next station of the transport line, the prediction being realized before stopping at a station that is, according to the current timetable, temporally located directly before the next station. For instance, with respect to FIG. 1, the passenger transport capacity that vehicle V7 will provide when it will stop at the platform A of the station 8 wherein passengers are waiting can be predicted by the system according to the invention while it did not yet reach station 9. The transport capacity corresponds to the number of available seats and optionally standing places available in the vehicle after it left a previous station and before it opens the door for receiving new passengers at a platform of a directly next station. The system according to the invention is thus capable of predicting a temporal evolution of the transport capacity of a vehicle of the transport line. The variation, as a function of the time, of the number of passengers on-board a vehicle of the line is determined and used by the processing unit 13 for predicting a future evolution of the number for the vehicle, and then determining the best measure for adapting the transport capacity of the line to the future evolution. Preferentially, the determination or measurement of the number of passengers by the VTCE unit is realized for all vehicles of a line that are currently in service, and preferentially for all lines of the transport network.

Thus, according to the present invention, the flows of passengers moving from stations to stations can be acquired or tracked by the main evaluation unit 10 through its VTCE unit 11, and/or the flows of passengers that are increasing the number of waiting passengers at the platforms can be acquired or tracked by the main evaluation unit 10 through its PPNE unit 12. In particular, the system 1 according to the invention determines or selects a measure that is configured for balancing the flows so that the offer in terms of available places in vehicles stopping at a platform of a line is at least equivalent to the demand for the places. "At least equivalent" means notably that the number of available places is at least not less than the demand, i.e. not less that the number of passengers waiting for the incoming vehicle. Preferentially, it shall also not exceed the demand of a predefined ratio, e.g. 4% more places are offered compared to places demanded. This enables to not oversize the offer with respect to the demand, and therefore to save energy by withdrawing a vehicle from the line if the offer exceeds the predefined ratio. For each vehicle of the line for which the number of passengers is tracked (i.e. determined or measured or counted by the VTCE unit 11), then each temporally successive determined or measured or counted number of passengers is sent to the processing unit 13 and/or stored in a database, e.g. in the cloud. Preferentially, the processing unit 13 stores the received or numbers of passengers and the time at which the numbers (e.g. one number for a first vehicle of the line, and another number for another vehicle of the line or of another line) were determined or measured in the database or cloud. This is preferentially performed for all passenger numbers received, e.g. for all vehicles of a line, or for all vehicles of the transport network.

The determination or measurement of the number of passengers on-board the vehicle is preferentially performed only once within the period of time separating two successive stops of the vehicle, namely a first stop at a first station directly followed by a second stop at a second station. The VTCE unit 11 is for instance configured for determining, after the closing of the doors at the first stop, the number of passengers on-board the vehicle, and optionally a remaining passenger transport capacity that will be effectively offered to the newly boarding passengers at the second stop, the remaining passenger transport capacity taking into account the number of on-board passengers that are going to leave the vehicle (hereafter the "leaving" passengers) at the second stop and being thus an estimation of the real transport capacity of the vehicle that will be offered to the newly boarding passengers after the leaving passengers effectively left the vehicle.

In order to determine the number of passengers on-board the vehicle, or alternatively its current transport capacity, the VTCE unit 11 can use different known in the art techniques, like:
  a) a weighing system configured for evaluating a number of passengers occupying the vehicle from a difference between a nominal load of the vehicle and a current load of the vehicle; and/or
  b) a camera system configured for counting the number of passengers boarding and leaving the vehicle; and/or
  c) a ticketing system configured for evaluating a number of passengers occupying the vehicle from an origin station and a destination station indicated on passenger tickets for the line; and/or
  d) an on-board system containing heat sensors installed on-board, configured for identifying body heat signatures and for counting from the identification the number of passengers within the vehicle;
  e) any other system capable of determining a current occupancy by passengers of the vehicle; and/or
  f) etc.

For determining the remaining transport capacity, the VTCE unit 11 preferentially uses passenger ticket information, and/or statistics configured for providing, as a function of the time and/or station and/or vehicle itinerary, a percentage of passengers leaving the transport vehicle at a given station on a given line at a given time. Optionally, the main evaluation unit may further comprise a passenger flow measurement system containing an on-board and/or platform camera system. For each door of the vehicle, the camera system contains a camera configured for acquiring images of an area containing the door, and configured for determining the number of passengers boarding the vehicle at each vehicle door and the number of passengers leaving the vehicle at each vehicle door from an analysis of passenger motion in the area in images acquired by the on-board and/or platform camera system. The VTCE unit can thus in particular determine the number of passengers boarding and/or leaving the vehicle at each stop of the vehicle at a platform of the line. The number of boarding passenger and the number of leaving passenger being then sent to the processing unit 13 together with the time at which they were acquired or measured and, preferentially, with an identifier of the vehicle and/or of the platform. The processing unit 13 is then notably configured for storing, in the database or cloud, the number of passengers entering and leaving the vehicle, the time at which the numbers were measured or determined, and optionally their associated component (vehicle or platform) identifier. I particular, each measured value of the number of passengers entering and leaving the vehicle at a given platform for a given itinerary, i.e. a given line, is then stored in the database in association with the time at which it was measured in order to compute statistics providing for instance a percentage of passengers leaving the vehicle at the given platform as a function of the time and optionally for a given itinerary. The percentage can be obtained via different techniques, e.g. combining the weight measurements obtained from the weighing system to the counted number of passengers leaving the vehicle obtained from the on-board and/or platform camera system.

At step 202, the processing unit 13 acquires or receives the following input data:
a) for each line for which the transport capacity has to be adapted according to the invention, the determined or measured or counted passenger number, and for each of the determined or measured or counted passenger number, the time at which it was measured or determined, and optionally, an identifier of the component or element of the line for which it was determined or measured. In particular, for each line for which the transport capacity has to be adapted, the processing unit 13 may receive as input several passenger numbers, each of the several passenger numbers being the number of passengers of a different component or element of the line. Preferentially, for each line for which a dynamic adaptation of the transport capacity has to be implemented, the processing unit 13 receives as input:
b) for one or several or each vehicle of the line that is in service: the number of passengers on-board the vehicle, the time at which this number was determined, and an identifier of the vehicle; and/or
c) for one or several or each platform served by one of the vehicles: the number of passengers waiting for an incoming vehicle and/or the number of passengers going to the platform, and for each number, the time at which the number was determined, and for each platform, an identifier of the platform; and/or
d) for one, several, or each station of the line: the number of passengers going to the station, which might have been acquired by a camera system or turnstile system or any other system capable of measuring the temporal flow of passengers entering a station;
e) a nominal timetable defining the arrival and departure times of the transport vehicles at the platforms of all transport lines whose transport capacity has to be adapted according to the invention. More generally speaking, the nominal timetable provides information about the position each transport vehicle of the line with respect to the time;
f) a nominal passenger transport capacity of each vehicle V1-V12 of each of the lines whose transport capacity has to be adapted according to the invention. This is in particular useful for determining for instance which vehicle of a depot D1, D2 has a suitable nominal passenger transport capacity for implementing a current adaptation of the transport capacity of a line by adding an additional vehicle to the line, or which running vehicle should be withdrawn from the line.

Apart from the above-mentioned input data, the processing unit 13 can be configured for acquiring or receiving at least one of the following additional input data:
a) a threshold defining a maximum number of passengers for a component of the line. Different thresholds might be used for the different components of the line. For instance, a threshold might be defined for a platform, or for each platform, or for a set of platforms, or for a station or a set of stations, or for a vehicle or a set of vehicles. Each of the thresholds enables to fix a limit from which the system will consider that there is a passenger congestion for the considered component; and/or
b) a threshold configured for defining an oversized transport capacity for the line with respect to a demand. The threshold enables to fix a limit from which the system will consider that the offer is oversized compared to the demand. For instance, if a predicted number of passengers at a platform or in a vehicle is below the threshold for a predetermined period of time, then the ATC algorithm automatically may implement a measure that includes withdrawing a vehicle from the line. Such a threshold can be defined for a vehicle, or platform, or station. It can be determined from an average of the transport capacity of all vehicles of the line as a function of the time versus an average of the number of passengers waiting for a vehicle for all served platforms of the line, or by considering only a predefined set of the platforms; and/or
c) a maximum difference defined between a flow of passengers arriving or joining the platform and a flow of passengers leaving the platform via vehicles stopping at the platform. This maximum difference can be defined for each platform. It enables to reach a balance between the demand (resulting from the flow of passengers reaching the platform for boarding a vehicle) and the offer (linked to the flow of passengers that will be able to board the incoming vehicle when it arrives, which depends on the transport capacity of the incoming vehicle, and thus on the number of passengers already on-board the vehicle when the passengers of the platform are boarding); and/or,
d) a line layout with stops information, i.e. stopping station and platform, stopping time; and/or,
e) a number of vehicles available in a depot D1, D2 and their nominal transport capacity, and optionally the depot D1, D2 location with respect to the line whose transport capacity has to be adapted. The depot location enables the system to determine which vehicle from which depot should be added to or withdrawn from the line if such a measure is determined by the processing unit 13. The latter will for instance automatically take into account the distance between the depot and a platform for which a congestion is predicted in order to determine what is the best solution for implementing the measure, for instance by automatically choosing a vehicle of a depot that is the closest to the platform where the congestion has been predicted; and/or
f) a minimum and maximum headway defined for the vehicles running on the line, notably for each line of the network for which the transport capacity has to be adapted; and/or g) a timetable deviation; and/or h) a location of each vehicle running on the line; and/or, i) an availability status of each vehicle of the line; and/or j) a vehicle depot information, indicating the location of the vehicle depot, a number of available vehicles in standby/sleeping mode in the depot, and for each vehicle in the depot, its nominal transport capacity; and/or k) holidays information for the country where the station is located. This information can be used as input to the trained function by the processing unit for predicting the future evolution of the number of passengers, for instance for predicting an increase or decrease of the number of passengers waiting for a vehicle at a platform of the line or on-board a vehicle; and/or l) forecasted event information defined for an area surrounding the station (sport events, music events, their relevance, estimated attendance . . . ). The area can be predefined, e.g. by determining for instance a radius of a circle originating at the position of the station and whose radius length, e.g. 1-2 km from the position of the station, will determine the area enclosed by the circle. The forecasted event information is preferentially used as input to the trained function for the prediction of the future evolution of the passenger number; and/or m) a forecasted weather information for the area where the station is located (rain, visibility, temperature, humidity, snowfall, wind speed and pollution conditions). The area can also be predefined by determining for instance another radius of a circle centered on the station. The forecasted weather information is preferentially used as input to the trained function for the prediction of the future evolution of the passenger number; and/or n) a traffic information regarding other transport means in an area surrounding the station. The traffic information is preferentially used as input to the trained function for the prediction of the future evolution of the passenger number; and/or o) a vehicle energy consumption for each vehicle configured for running on the line.

At step 203, the processing unit 13 applies a trained function to the temporal evolution of the number(s) of passengers received as input, wherein the trained function optionally takes into account (i.e. uses also as input) the traffic information and/or forecasted weather information and/or forecasted event information and/or holidays information for predicting a future temporal evolution of the numbers of passengers received as input. Preferably, for each component or element of a line for which the passenger number has been determined, the processing unit 13 creates, from all or part of the received numbers for the component or element, a set of temporally successive passenger numbers describing thus the temporal evolution of the passenger numbers, notably for first period of time that is notably a predefined past period of time ending at a present time, e.g. for the last 30 minutes. In other words, for each component or element for which the passenger number is determined at different times, the processing unit 13 is configured for creating the set and populating the latter with the passenger numbers received from the element or component, so that the set comprises a succession of passenger numbers ordered according to the time at which each passenger number was determined, from the earliest determination to the latest determination in order to cover the first period of time. It does the same for the numbers of passengers of each component or element for which it receives the numbers as input. By this way, it is able to create, for each component or element of a transport line for which the numbers are determined, a set of the numbers describing the temporal evolution of the numbers during the first period of time, the predefined time period being preferentially the same for all of the components or elements for which the numbers were determined, i.e. having the same temporal starting time and end time, the end time being preferentially the present time or as close as possible to the present time. The trained function is a function trained by a machine learning algorithm for automatically predicting a future temporal evolution of each number of passengers that has been received as input. It is thus able to predict the temporal evolution of the number of passengers of each line component or line element for which the number of passengers was determined at different times and sent or acquired by the processing unit. Preferentially, the trained function uses as input at least one of the set of temporally successive numbers (i.e. a set of numbers describing the temporal evolution of the number of passengers of a component or element of the line), and provides for each of the sets used as input, a resulting set that comprises also a succession of future numbers of passengers, wherein the future numbers of the set are temporally ordered according to an increasing time difference with a present time (i.e. ordered from the temporally closest future number of passengers to the temporally most distant future number), wherein the number of the future passenger numbers in the resulting set is configured for covering a predefined future period of time, preferentially starting from the present time and extending for a predefined length of time, for instance 1 or 2 hours, and describes thus a future temporal evolution of the received numbers for the concerned element or component of the line within the future predefined period of time. Preferentially, the trained function is a random forest.

The processing unit 13 is then configured for using:

a) the future temporal evolution of the received number(s), in particular all future temporal evolutions that have been determined by the trained function, b) the nominal timetable, and c) the nominal passenger transport capacity of the vehicles as input to a TCA algorithm configured for determining and outputting a measure for adapting the transport capacity of each line for which a future temporal evolution of the number of passengers of one of its components or elements has been determined by the trained function. In particular, the measure is determined by the TCA algorithm as a function of at least one of the additional input data.

Preferably, in order to determine the measure, the TCA algorithm is configured for automatically determining whether the future temporal evolution of at least one or each of the passenger numbers satisfies at least one or all requirements of a set of requirements. The set of requirements comprises notably requirements regarding the number of passengers that might occupy a vehicle and/or a station and/or a platform at a same time, and/or regarding a temporal evolution of the number of passengers that might occupy a vehicle and/or a station and/or a platform. The set of requirements might depend on or might be a function of the threshold of the additional input data, and/or of the maximum difference. For instance, as soon as the threshold defining a maximum number of passengers for a platform is exceeding for a given period of time by the predicted future passengers numbers for the platform, then the TCA algorithm is configured for automatically modifying the timetable so that this threshold be not exceeded, for instance by automatically adding a vehicle to the line, wherein the added vehicle will serve at least the platform for which the predicted numbers exceeded the threshold. The TCA algorithm is thus configured for automatically determining a measure for adapting the transport capacity of the line and preferentially for automatically modifying the nominal timetable according to the determined measure in order to generate an updated timetable. In particular, if the processing unit 13 receives as input the number of passengers that is going to a platform and its trained function outputs a future temporal evolution of the number of passengers that is going to the platform, then the TCA algorithm uses as input the nominal timetable and the nominal transport capacity of the vehicles of the line for determining a future number of passengers waiting at the platform as a function of the nominal timetable, and whether the temporal evolution of the future numbers satisfies at least one or all requirements of the set of requirements. As already explained, the TCA algorithm may then automatically determine a measure and modify the nominal timetable accordingly if one, several, or all requirements are not satisfied.

Optionally, the TCA algorithm is configured for testing a predefined set of measures by applying each of the measures of the set to the predicted temporal evolution of the number of passengers of all components or elements of the line for which such temporal evolution has been predicted and for automatically determining which measure(s) satisfy(ies) at least one or a part or all requirements of the set of requirements, classifying for instance the measures according to a degree of satisfaction of the requirements of the set of requirements and selecting the measure with the higher degree of satisfaction for modifying the nominal timetable and applying to the line the modified nominal timetable (updated timetable). Optionally, each requirement of the set of requirements might be associated to a weight, the weight being used for calculating the degree of satisfaction. For instance, one requirement could be to save energy associated to a weight value of 5, another requirement with a weight value of 7 can be to keep the waiting time at a platform below a predefined threshold value, and another requirement associated to a weight value of 4, to reach a predefined occupancy value for each transport vehicle of the line.

The TCA algorithm might be further configured for determining or outputting at least one of the following additional data from the future temporal evolution of number(s) outputted by the trained function:

one or several predictive KPIs among:
a) a predicted vehicle occupancy, e.g. a percentage of occupancy, as a function of the time for the future temporal evolution if the measure is not applied. This predicted vehicle occupancy is notably determined by the TCA algorithm from the nominal timetable, the nominal transport capacity of the vehicles, and, for at least one preferentially all platforms of the line, from the predicted future evolution of the number of passengers that are going to the considered platform as a function of the time; and/or
b) a predicted platform and/or station and/or line passenger occupancy as a function of the time for the future temporal evolution if the measure is not applied; and/or
c) a predicted average waiting time, defined as a function of the time, for passengers who will wait for a next incoming vehicle at the platform according to the future temporal evolution, the average waiting time being defined for instance as the average during a predefined period of time of the time differences between the arrival time at the platform of a first incoming vehicle and the arrival time of a directly next incoming vehicle if the measure is not applied;
d) a predicted total waiting time for passengers of a platform, and/or station, and/or line if the measure is not applied. The predicted total waiting time is the sum of the waiting times for the considered element of the line over all passengers who will be waiting at the considered element (i.e. platform, station, line). For instance, if 20 passengers a predicted at a platform, and each passenger waits 4 minutes (average waiting time), then the total waiting time for the platform is 80 minutes; and/or one or several optimized KPIs among:
e) the predicted vehicle occupancy, e.g. a percentage of occupancy, as a function of the time for the future temporal evolution if the measure is applied; and/or
f) the predicted platform and/or station and/or line passenger occupancy as a function of the time for the future temporal evolution if the measure is applied; and/or
g) the predicted average waiting time, defined as a function of the time, for passengers who will wait for a next incoming vehicle at the platform according to the future temporal evolution if the measure is applied, the predicted average waiting time being defined for instance as the average during a predefined period of time of the time differences between the predicted arrival time at the platform of a first incoming vehicle and the predicted arrival time of a directly next incoming vehicle if the measure is applied;
h) the predicted total waiting time for passengers of a platform, and/or station, and/or line if the measure is applied.

The updated timetable that is an optimized timetable configured for implementing the determined measure. In this case, the TCA algorithm is configured for automatically generating the updated timetable from the determined measure and the nominal timetable or a current timetable which might already comprise a previous update compared to the nominal timetable.

Preferentially, the TCA algorithm is configured for using one of the additional input data for determining the measure, and the updated timetable configured for implementing the measure:
a) the line layout;
b) the number of vehicles available in a depot and their nominal transport capacity;
c) the depot information;
d) the minimum and maximum headway;
e) the timetable deviation;
f) the location of each vehicle;
g) the availability status of each vehicle;
h) the vehicle energy consumption.

The processing unit 13 might be further configured for sending a passenger congestion warning, e.g. to a platform, and/or to the control center 20, and/or to a station, and/or to a line, and/or to a vehicle. In particular, if the processing unit 13 does not receive a temporal evolution of the number of passengers per platform, but only a temporal evolution of the number of passengers in the line, then the processing unit 13 is configured for calculating the platform occupancy on a line basis.

The present invention also proposes a method for providing the trained function. The method includes notably:

a) receiving, via a first interface, for instance by the processing unit 13, input training data, wherein the input training data includes:

a1) passenger numbers as a function of the time for one or several elements or components of the line. For instance, it can receive the number of passengers of a vehicle serving a platform of a station of a line, and/or the number of passengers waiting for a vehicle at a platform and/or the number of passengers going to a platform to take a vehicle for travelling from a station to another station and/or the number of passengers entering a station. Preferentially, for each element or component of the line, a set containing several numbers of passengers are received, wherein the several numbers describe a temporal evolution of the number of passengers for the element or component of the line, each number of passengers being associated to a time data describing the time at which the number of passengers was determined or measured for the component or element, and the set further containing preferentially an identifier of the element or component for which the numbers were determined. The processing unit might receive thus one or several of the sets, each set containing passenger numbers associated each to a time data which define the temporal evolution of the number of passengers of an element or component of the line, wherein the temporal evolution takes place during a first period of time. The first period of time can be one month, or one year, or any period of time.

a2) optionally, a set of timetables, wherein each of the above-mentioned set is preferentially associated to a single timetable. Using a set of timetables as input for training the function is for instance necessary if the temporal evolution of the number of passengers that is received as input depends on a specific timetable, which, for instance, might not be the case for the number of passengers going to a platform as a function of the time. In particular, the input training data do not comprise such a set of timetables if the passenger numbers as a function of the time for one or several elements or components of the line that are used as input have been acquired for the nominal timetable, being for instance history data recorded in connection with the nominal timetable;

b) receiving, via a second interface, output training data, wherein the output training data comprises:

b1) for each of the one or several elements or components of the line for which the numbers of passengers as a function of the time has been received as training input, a future temporal evolution of the numbers of passengers. In other words, for each set received as training input for an element or component of the line, an associated set is received as training output, wherein the associated set contains passenger numbers associated each to a time data so as to define another temporal evolution of the number of passengers of the element or component of the line, wherein the another temporal evolution takes place during a second period of time, which is temporally consecutive to the first period of time, and thus temporally located after the first period of time. For each set received as training input for an element or component of the line, the associated set describes the future temporal evolution of the number of passengers of the element or component of the line;

c) training a function based on the input training data and output training data with a training computation unit;

d) providing, via a third interface, the trained function to the processing unit 13 of the system 1 for predicting a future temporal evolution of a passenger number of the line, for instance the future temporal evolution of the number of passengers of one or several of the components or elements of the line.

The input training data may contain one or several of the additional input data, notably a traffic information associated to a time data, a forecasted weather information associated to a time data, a forecasted event information associated to a time data, holidays information, that can be used for training the function, so that the trained function is then configured for processing the one or several additional input data in order to predict an evolution of the number of passengers of an element or component of the line as a function of one or several of the additional input data. The trained function is then able to predict a future temporal evolution of the number of passengers at a platform as a function for instance of traffic information, and/or forecasted weather information, and/or forecasted event information, and/or holidays.

Finally, at step 204, the system according to the invention, for instance its processing unit 13, is configured for applying the measure to the transport line. For this purpose, it can for instance send a message to a control center 20, wherein the message is configured for commanding an implementation of the measure by the control center 20. Alternatively, the processing unit 13 can be configured for sending the updated timetable to a control system in charge of the management of the line traffic, wherein the control system is configured for automatically implementing the updated timetable by adapting the running of the vehicles of the line accordingly, and if required adding or withdrawing a vehicle.

To summarize, the present invention provides a method and a system for dynamically adapting a passenger transport capacity of a transport line to a number of passengers using the line for travelling. The proposed invention enables to find the right balance between the demand in terms of number of travelling passengers and the offer in terms of transport capacity offered by the running vehicles. The present invention advantageously enables a dynamic adaptation of the timetable, preventing thus passenger congestion at a platform as well as saving energy by avoiding oversized offer with respect to a current demand.

The invention claimed is:

1. A system for dynamically adapting a passenger transport capacity of a transport line to a number of passengers of the transport line, the transport line having at least two stations, each of the stations having at least one platform served by transport vehicles of the transport line, the system comprising:

a main evaluator configured for automatically determining, as a function of time, the number of passengers of the transport line;

a processor configured for receiving or acquiring input data as follows:
the number of passengers as a function of the time;
a nominal timetable for the transport line; and
a nominal passenger transport capacity of each transport vehicle of the transport line that can serve platforms;

said processor running a trained function, and for applying said trained function to said number of passengers as a function of the time, said trained function having been trained by a machine learning algorithm for automatically predicting a future temporal evolution of the number of passengers, said processor being configured for automatically determining, from the future temporal evolution, the nominal timetable, and the nominal passenger transport capacity, a measure for adapting the passenger transport capacity of the transport line to the future temporal evolution, wherein the measure is:

adding a transport vehicle to the transport line if, in the future temporal evolution, the number of passengers exceeds a first predefined threshold for a first given period of time; or withdrawing a transport vehicle from the transport line if, in the future temporal evolution, the number of passengers is smaller than a second given threshold for a second given period of time; or otherwise maintaining the passenger transport capacity defined by the nominal timetable; and the system being further configured for applying the measure to the transport line.

2. The system according to claim 1, wherein the number of passengers of the transport line is the number of passengers of one of its components being a first component, the components having at least the vehicles, the stations, and the platforms of the stations.

3. The system according to claim 2, wherein said processor is configured for receiving or acquiring or generating, for said first component, a first set of data, wherein said first set of data includes said number of passengers as a function of the time being a temporal evolution of the number of passengers for said first component, said temporal evolution taking place within a first period of time, said processor configured for using said first set as input to the trained function, the trained function configured for outputting a first outputted set of data, wherein the first outputted set of data defines, for said first component, the future temporal evolution of its number of passengers.

4. The system according to claim 3, wherein said main evaluator is configured for automatically determining, as a function of the time, the number of passengers of another component, being a second component, of the transport line.

5. The system according to claim 4, wherein said processor is configured for receiving or acquiring or generating, for said second component, a second set of data, wherein said second set of data contains said number of passengers as a function of the time being a temporal evolution of the number of passengers for said second component, said temporal evolution taking place within the first period of time, said processor configured for using said second set of data together with said first set of data as input to the trained function, the trained function configured for outputting, in addition to the first outputted set, a second outputted set of data, wherein the second outputted set of data defines, for said second component, the future temporal evolution of its number of passengers.

6. The system according to claim 5, wherein said processor is configured for automatically determining, from:

the future temporal evolution of the number of passengers of the first component;

the future temporal evolution of the number of passengers of the second component;

the nominal timetable; and the nominal passenger transport capacity; and said measure for adapting the transport capacity of the transport line to said future temporal evolutions of the first and second components.

7. The system according to claim 2, wherein said processor is configured for acquiring at least one of the following additional data and using at least one of the additional data for determining said measure:

a threshold defining a maximum number of passengers for a component of the transport line; and/or a maximum difference defined between a flow of passenger arriving at a platform and a flow of passenger leaving said platform via the transport vehicles stopping at said platform; and/or a threshold configured for defining an oversized transport capacity for the transport line with respect to a demand.

8. The system according to claim 1, wherein said main evaluator has a vehicle transport capacity evaluation unit configured for determining, as a function of the time, the number of passengers on-board a transport vehicle of the transport line.

9. The system according to claim 1, wherein said main evaluator has a platform passenger number evaluation unit configured for determining, as a function of the time, the number of passengers waiting for a transport vehicle at the at least one platform and/or the number of passengers going to the at least one platform.

10. The system according to claim 1, wherein the trained function further uses as an input at least one of the following data:

forecasted weather information;

traffic information;

forecasted event information; and holiday information.

11. The system according to claim 1, wherein said processor has a transport capacity adaptation algorithm configured for automatically generating an updated timetable containing said measure.

12. The system according to claim 1, wherein said processor is further configured for determining from the future temporal evolution:

at least one predictive key performance indicator being:

a predicted vehicle occupancy as a function of the time for the future temporal evolution if the measure is not applied; and/or a predicted platform and/or station and/or line passenger occupancy as a function of the time for the future temporal evolution if said measure is not applied; and/or a predicted average waiting time, defined as a function of the time, for passengers who will wait for a next incoming vehicle at a platform according to said future temporal evolution if said measure is not applied;

a predicted total waiting time if said measure is not applied;

at least one optimized key performance indication from:

said predicted vehicle occupancy as a function of the time for said future temporal evolution if said measure is applied; and/or said predicted platform and/or station and/or line passenger occupancy as a function of the time for said future temporal evolution if said measure is applied; and/or said predicted average waiting time, defined as a function of the time, for the passengers who will wait for a next incoming vehicle at a platform according to said future temporal evolution if said measure is applied; and
a predicted total waiting time if said measure is applied;
an optimized timetable containing the measure; and
a passenger congestion warning to be sent.

13. A method for dynamically adapting a passenger transport capacity of a transport line to a number of passengers, the transport line having at least two stations, each of the stations having at least one platform served by transport vehicles of the transport line, which method comprises the steps of:
  determining a temporal evolution of the number of passengers for the transport line;
  receiving, by a processor, the following input data:
    the temporal evolution of the number of passengers;
    a nominal timetable defining a serving of platforms of the line by the transport vehicles; and
    a nominal passenger transport capacity of each of the transport vehicles of the transport line that can serve the platforms;
  applying, via the processor, a trained function to the temporal evolution of the number of passengers, wherein the trained function being trained by a machine learning algorithm for automatically predicting a future temporal evolution of the number of passengers, and determining, by the processor from said future temporal evolution, the nominal timetable and the nominal passenger transport capacity, a measure for adapting the passenger transport capacity of the transport line to the future temporal evolution; and
  applying the measure to the transport line by performing one of the sub-steps of:
    adding a transport vehicle to the transport line if, in the future temporal evolution, the number of passengers exceeds a first predefined threshold for a first given period of time; or
    withdrawing a transport vehicle from the transport line if, in the future temporal evolution, the number of passengers is smaller than a second given threshold for a second given period of time; or
    otherwise maintaining the passenger transport capacity defined by the nominal timetable.

* * * * *